(12) United States Patent
Holzheimer et al.

(10) Patent No.: US 7,969,349 B2
(45) Date of Patent: Jun. 28, 2011

(54) SYSTEM AND METHOD FOR SUPPRESSING CLOSE CLUTTER IN A RADAR SYSTEM

(75) Inventors: Timothy R. Holzheimer, Rockwall, TX (US); Vernon R. Goodman, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 154 days.

(21) Appl. No.: 12/418,958

(22) Filed: Apr. 6, 2009

(65) Prior Publication Data

US 2010/0253573 A1 Oct. 7, 2010

(51) Int. Cl.
*G01S 13/00* (2006.01)

(52) U.S. Cl. .......................................... 342/176; 342/27

(58) Field of Classification Search .............. 342/27–28, 342/176
See application file for complete search history.

(56) References Cited

U.S. PATENT DOCUMENTS

| | | | |
|---|---|---|---|
| 4,749,994 A | 6/1988 | Taylor, Jr. ...................... | 342/195 |
| 5,134,406 A * | 7/1992 | Orr ................................. | 342/20 |
| 6,184,820 B1 | 2/2001 | Kratzer ........................... | 342/160 |
| 6,186,949 B1 * | 2/2001 | Hatfield et al. ................ | 600/443 |
| 6,509,835 B1 * | 1/2003 | Krubiner et al. .............. | 340/554 |
| 6,590,520 B1 * | 7/2003 | Steele et al. ................... | 342/26 R |
| 7,006,034 B1 | 2/2006 | Krikorian et al. ............. | 342/159 |
| 7,053,820 B2 | 5/2006 | Goodman et al. ............. | 342/179 |
| 7,375,676 B1 | 5/2008 | Loberger ........................ | 342/160 |
| 7,460,059 B1 | 12/2008 | Ormesher et al. ............. | 342/159 |
| 2004/0252083 A1 * | 12/2004 | Watanabe et al. ............. | 345/74.1 |
| 2006/0077301 A1 * | 4/2006 | Okamoto ....................... | 348/638 |
| 2006/0181451 A1 | 8/2006 | Samson, Jr. .................... | 342/160 |
| 2006/0232440 A1 * | 10/2006 | Pieralli et al. .................. | 340/905 |
| 2006/0251189 A1 * | 11/2006 | Ruelke et al. .................. | 375/329 |

* cited by examiner

*Primary Examiner* — Thomas H Tarcza
*Assistant Examiner* — Timothy A Brainard
(74) *Attorney, Agent, or Firm* — Baker Botts L.L.P.

(57) ABSTRACT

A system for processing electromagnetic waves in a radar system is disclosed. The system includes a transmitter operable to transmit operating waves and calibration waves, one or more receivers operable to receive reflected calibration waves and operating waves, and a system controller operable to process the received calibration waves and operating waves. The system controller may process the received waves by generating a threshold signal based on the calibration waves, and comparing the threshold signal to the operating waves. The system controller may also process operating waves and calibration waves in accordance with one or more signal conditioning algorithms. Additionally, the system controller may display an image representing a target on a display by comparing received operating waves with the generated threshold signal.

25 Claims, 3 Drawing Sheets

SYSTEM AND METHOD FOR SUPPRESSING CLOSE CLUTTER IN A RADAR SYSTEM

TECHNICAL FIELD OF THE INVENTION

This invention relates generally to processing electromagnetic waves, and more particularly to a method and system processing electromagnetic waves to reduce or eliminate clutter in a radar system.

BACKGROUND OF THE INVENTION

When using impulsive radar on a moving ground vehicle, close clutter due to the environment often obscures targets a user is trying to detect. This clutter can vary due to slight changes in the surface, vibration of the vehicle, and source and digitizer jitter. Correcting for clutter by simply decreasing the sensitivity with which targets are detected, may result in some targets being missed or other undesirable effects. As a result, previous attempts to solve this problem have resulted in lost targets, lowering the probability of detection, and not accounting for variations in the clutter.

SUMMARY OF THE INVENTION

The present invention provides a method and system for transmitting, receiving, and processing electromagnetic waves that substantially eliminates or reduces at least some of the disadvantages and problems associated with previous methods and systems for processing electromagnetic waves.

In accordance with one embodiment of the present invention, a method for processing electromagnetic waves includes transmitting a calibration wave, receiving a reflected calibration wave, and generating a threshold signal based on the received calibration wave. The method also includes transmitting an operating wave, receiving a reflected operating wave and comparing the operating wave to the threshold signal. The method also includes displaying an image based on the comparison between the operating wave and the threshold signal.

In accordance with another embodiment of the present invention, a system for transmitting, receiving, and processing electromagnetic waves includes a transmitter operable to transmit operating waves and calibration waves, one or more receivers operable to receive reflected calibration waves and operating waves, and a system controller operable to process the received calibration waves and operating waves. The system controller may process the received waves by generating a threshold signal based on the calibration waves, and comparing the threshold signal to the operating waves. Additionally, the system controller may process operating waves and calibration waves in accordance with multiple signal conditioning algorithms.

Important technical advantages of certain aspects of the present invention include increasing the probability that targets will be detected. By operating in the time domain to reduce or eliminate environmental interference and clutter, the system facilitates the detection of targets which may have otherwise been obscured. Other technical advantages of certain aspects of the present invention include the ability to reduce or eliminate environmental interference or clutter under a wide array of conditions and configurations. By providing a flexible method of modifying a threshold signal, the system substantially reduces or eliminates clutter associated with transmission from a moving, ground-based vehicle. Moreover, certain aspects of the present invention may represent elements of a multi-static radar system, allowing for dynamic arrangement of transmitters and receivers. That is, the location of transmitters and receivers as positioned on a vehicle, or as fixed in the ground, may be dynamically configurable according to the particular needs of a user, the terrain in which targets are located, or any other considerations. Additionally, certain aspects of the present invention may be rapidly installed or removed, allowing for quick reaction to changing events. Dynamic arrangement thus allows for optimal target detection in a variety of situations and environments. Thus, certain aspects of the present invention allow for the detection of targets when operating on a moving vehicle or in rough or difficult terrain. In addition, other technical advantages of certain aspects of the present invention include allowing a user to more precisely and accurately locate a target by utilizing multiple receivers and generating a three-dimensional image representing a target. Additionally, at appropriate times during operation, an embodiment of the present invention may allow for the background environment to be re-characterized when no targets are present. Thus, an embodiment of the present invention may be periodically re-calibrated while continuing detection of targets.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantage, reference is now made to the following description, taken in conjunction with the accompanying drawings, in which.

DETAILED DESCRIPTION OF THE INVENTION

Figure 1:
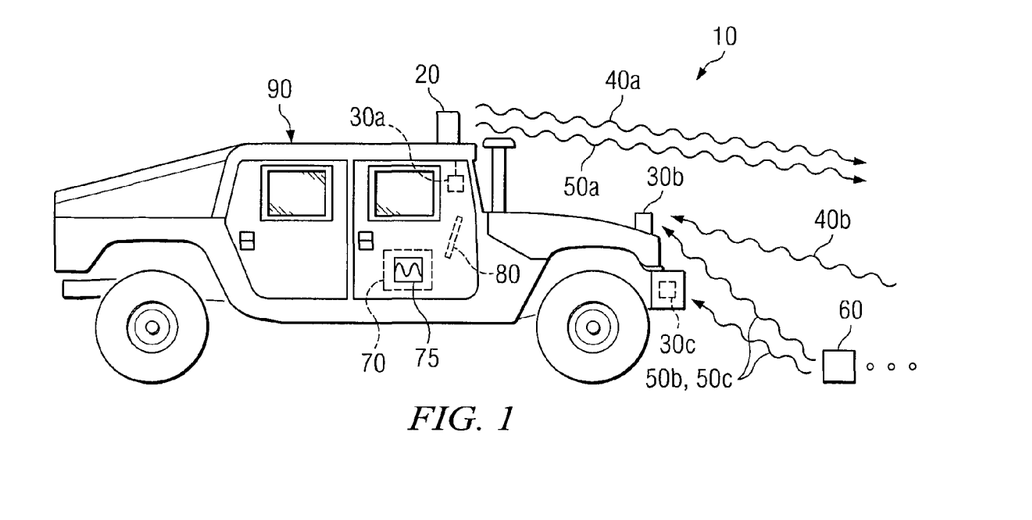
FIG. 1 is a block diagram illustrating a multi-static electromagnetic wave processing system, including a transmitter, a receiver, a system controller for processing electromagnetic waves, and a display for displaying images corresponding to a target.

FIG. 1 illustrates a particular embodiment of a system 10 for processing electromagnetic waves transmitted by a transmitter 20 and received by a receiver 30. System 10 includes transmitter 20, receiver 30, a system controller 70, a display 80, and a vehicle 90. To facilitate the detection of a target 60, system 10 processes electromagnetic waves reflected from target 60 and other sources, removes electromagnetic interference and clutter, and displays an image representing target 60 on display 80.

Transmitter 20 transmits calibration waves 40 and operating waves 50 generated by system controller 70. In particular embodiments transmitter 20 may include a power source, oscillator, an amplifier, and antenna. In general, however, transmitter 20 may be any appropriate combination of hardware and/or software suitable for transmitting calibration waves 40 and operating waves 50 in system 10. Transmitter 20 may be mounted on vehicle 90. Additionally, transmitter 20 may be mounted in a ground-based fixed or stationary position. Although FIG. 1 illustrates, for purposes of example, an embodiment of system 10 that includes a single transmitter 20 mounted on vehicle 90, alternative embodiments of system 10 may include one or more transmitters 20. For instance, particular embodiments of system 10 may include a transmitter 20 corresponding to each receiver 30. Other embodiments of system 10 may include more transmitters 20 than receivers 30. In general, system 10 may include any appropriate number of transmitters 20. Moreover, each transmitter 20 may be dynamically positioned on vehicle 90. That is, the location in which transmitter 20 is positioned on vehicle 90 may be changed according to the particular needs of a user, the particular terrain in which system 10 is operating, or any other factors, considerations, variables, or conditions without requiring substantial additional modification to system 10.

Receivers 30a, 30b, and 30c (which each may be referred to generically as a "receiver 30" or collectively as "receivers 30") receive calibration waves 40 and operating waves 50 associated with calibration waves 40 and operating waves 50 transmitted by transmitter 20, reflected from the environment or target 60. Additionally, receivers 30 transmit an electronic signal to system controller 70 corresponding to received operating waves 50 and calibration waves 40. In particular embodiments, receivers 30 may include a power source, a processor for processing received calibration waves 40 and operating waves 50, an amplifier, an antenna, and electronic filters to filter out undesirable electromagnetic waves. In general, however, receivers 30 may be any appropriate combination of hardware and/or software suitable for receiving calibration waves 40 and operating waves 50 in system 10. Receivers 30 may be mounted on vehicle 90. Additionally, receivers 30 may be mounted in a ground-based fixed or stationary position. Although FIG. 1 illustrates, for purposes of example, an embodiment of system 10 that includes three identical receivers 30 mounted on vehicle 90, alternative embodiments of system 10 may include any appropriate number and suitable types of receivers 30. Particular embodiments of system 10 may include a receiver 30 corresponding to each transmitter 20, or may include more receivers 30 than transmitters 20, or may include more transmitters 20 than receivers 30. Additionally, each receiver 30 may be dynamically arranged on vehicle 90. Particular embodiments of system 10 may enable a user to position or reposition receivers 30 on vehicle 90, according to the particular needs of a user, the particular terrain in which system 10 is operating, or any other factors, considerations, variables, or conditions without requiring substantial additional modification to system 10.

Calibration waves 40a and 40b (which each may be referred to generically as a "calibration wave 40" or collectively as "calibration waves 40") are electromagnetic waves transmitted by transmitter 20, reflected by ground, air, water, or other aspect of the environment, and received by receivers 30. In particular embodiments, calibration waves 40 may be ultra-wideband radio frequency waves, microwaves, or waves having any other appropriate frequency within the electromagnetic spectrum suitable for transmission by transmitter 20 and reception by receiver 30. Although FIG. 1 illustrates, for purposes of example, an example embodiment of system 10 that includes two calibration waves 40, alternative embodiments of system 10 may include any appropriate number calibration waves 40.

Operating waves 50a, 50b, and 50c (which each may be referred to generically as a "operating wave 50" or collectively as "operating waves 50") are electromagnetic waves transmitted by transmitter 20, reflected by target 60 or the environment, and received by receiver 30. In particular embodiments, operating waves 50 may be ultra-wideband radio frequency waves, microwaves, or waves having any other appropriate frequency within the electromagnetic spectrum suitable for transmission by transmitter 20 and reception by receiver 30. Although FIG. 1 illustrates, for purposes of example, an example embodiment of system 10 that includes three operating waves 40, alternative embodiments of system 10 may include any appropriate number operating waves 40.

Target 60 is an object suitable for detection, processing and/or analysis by system 10. Target 60 may be a mine, wire, spikes, weaponry, elements of nature, a man-made obstacle, or any other object appropriate for detection by system 10. Although FIG. 1 illustrates for purposes of example a single target 60, alternative embodiments of system 10 may include any appropriate number and types of target 60. For example, particular embodiments of system 10 may by configured to detect one, two, or multiple targets 60 simultaneously.

System controller 70 generates calibration waves 40 and operating waves 50 suitable for transmitting by transmitter 20, receives electronic signals corresponding to calibration waves 40 and operating waves 50 received by receiver 30, processes calibration waves 40 and operating waves 50, generates threshold signal 75 based on calibration wave 40, and transmits electronic signals to display 80 based on processed operating waves 50 and threshold signal 75. System controller 10 may include a computer processor, electronic circuitry, memory, a user input device, or any other appropriate hardware or software components suitable for operation in system 10. Although shown in FIG. 1 as a single component, in particular embodiments, system controller 70 may represent functionality provided by several separate physical components. In general, however, system controller 70 may be any appropriate combination of hardware and/or software suitable to provide the described functions in system 10.

Threshold signal 75 is an electromagnetic wave generated by system controller 70 based on received calibration waves 40. Received operating waves 50 may be compared with threshold signal 75 to generate a display corresponding to target 60 on display 80. In particular embodiments, threshold signal 75 may be generated in the ultra-wideband radio frequency spectrum, the microwave spectrum, or in any other appropriate frequency within the electromagnetic spectrum. Although FIG. 1 illustrates, for purposes of example, an example embodiment of system 10 that includes a single threshold signal 75, in alternative embodiments of system 10 that include multiple receivers 30, system controller 70 may generate multiple threshold signals 75, each threshold signal 75 based on a particular calibration wave 40 received by a different receiver 30.

Display 80 receives an electronic signal from system controller 70 and displays an image corresponding to target 60. Examples of display 80 include, but are not limited to, a computer monitor, a laptop display, a television, a radar imaging display, or any other hardware device suitable for displaying electronic images. In general, however, display 80 may be any appropriate combination of hardware and/or software suitable for displaying an image corresponding to target 60 in system 10. Although FIG. 1 illustrates, for purposes of example, an embodiment of system 10 including a single display 80, alternative embodiments of system 10 may include any appropriate number and suitable types of display 80.

Vehicle 90 accommodates transmitter 20, receivers 30, system controller 70, and display 80. In particular embodiments, vehicle 90 may be a moving or stationary ground-based vehicle, a moving or stationary manned or unmanned aerial vehicle, a moving or stationary surface or subsurface ship, or any other type of vehicle suitable to perform the described functions. In particular embodiments, vehicle 90 is not included in system 10, and transmitter 20, receivers 30, system controller 70, and display 80 may be utilized in a ground-based fixed or stationary position.

In operation, system 10 processes calibration waves 40 and operating waves 50 transmitted by transmitter 20, reflected from target 60, and received by receiver 30. System 10 then displays images corresponding to target 60 on display 80.

In particular embodiments, system controller 70 processes received calibration waves 40 and operating waves 50 by: suppressing carrier-wave interference to reduce or eliminate environmental interference; aligning waveforms received from one or more receivers 30; blanking portions of received calibration waves 40 and operating waves 50 corresponding to clutter from objects or structures in close proximity to transmitter 20 or receivers 30; conditioning electromagnetic signals received by receiver 30 according to multiple signal conditioning algorithms; and canceling a portion of received calibration waves 40 and operating waves 50 corresponding to clutter from antenna coupling. Additionally, system 10 generates threshold signal 75 based on one or more calibration waves 40, and compares threshold signal 75 to received operating waves 50 to cancel a portion of received operating wave 50 corresponding to close clutter from system, ground, and vehicle echoes, variations due to slight elevation changes, variations due to vibration, and variations due to source and receiver jitter. By thus reducing or eliminating clutter and interference received by receiver 30, system 10 may increase the probability of detecting target 60.

An example of this process, as implemented by a particular embodiment of system 10, is illustrated in FIG. 1. As shown in FIG. 1, transmitter 20 transmits calibration wave 40 in an environment in which no targets 60 are present. Receivers 30 receive calibration wave 40 reflected from the ground, water, air, or other aspect of the environment, and corresponding to the transmitted calibration wave 40. As discussed in more detail below, system controller 70 may process received calibration wave 40 by performing one or more of carrier-wave interference suppression, waveform alignment, close blanking, and signal conditioning. In particular embodiments, system 10 may transmit and receive multiple calibration waves 40, which are each processed by system controller 10 by performing one or more of carrier-wave interference suppression, waveform alignment, close blanking, and signal conditioning. Additionally, system controller 70 may record, condition and average together each of the multiple calibration waves 40 to obtain an average representation of an environment in which no targets 60 are present.

As previously discussed, system controller 70 may process received calibration waves 40 by performing one or more operations on calibration waves 40. In particular embodiments, system controller 70 may process calibration waves 40 by performing carrier-wave interference suppression in the frequency domain. A primary source of electromagnetic interference is from cell phones, other personal communications systems, commercial television, radio stations and security systems. Carrier-wave interference suppression may reduce or eliminate this environmental interference by filtering out undesirable frequencies.

Further, system controller 70 may perform waveform alignment to time-align received calibration waves 40 to correct for path delays which may occur in particular embodiments of system 10 that include multiple receivers 30. In particular embodiments of system 10, multiple receivers 30 may be utilized, each positioned a different respective distance, a different respective elevation angle, and a different respective azimuth angle from the reflecting object, which may include target 60, the ground, air, water, or any other environmental object. Thus, although reflected from the same object, received calibration waves 40 may arrive at each receiver 30 at different points in time. Waveform alignment determines the correct time reference for each received calibration wave 40 so that algorithmic processing may occur on the correct time sample simultaneously on all received calibration waves 40.

Further, system controller 70 may perform close blanking on calibration waves 40 to reduce or eliminate electromagnetic waves reflected from within the antenna head or from objects in close proximity to transmitter 20 or receivers 30. In particular embodiments, close blanking may be accomplished by setting to zero the amplitude of a portion of received calibration wave 40 corresponding to the earliest temporal portion of the respective wave.

Further, system controller 70 may perform signal conditioning on the received calibration wave 40. In particular embodiments, signal conditioning may include cross-correlation with a representative waveform, envelope detection, and/or advanced processing techniques such as Wiener-Levinson deconvolution, spiking (wavelet compression), and echo detection.

Additionally, system controller 70 generates and stores one or more threshold signals 75 based on one or more of calibration waves 40. As discussed with particular reference to FIGS. 4A-4C below, in particular embodiments, system controller 70 may generate one or more threshold signals 75 by increasing the amplitude and linearly phase-distorting received calibration waves 40. In particular embodiments, system controller 70 may make no modifications to received calibration wave 40, and threshold signal 75 may be identical to one or more received calibration waves 40. In particular embodiments, system controller 70 may receive, condition, and average multiple calibration waves 40. Thus, threshold signal 75 may be based on the average calibration wave 40. Additionally, in particular embodiments of system 10 that include multiple receivers 30, system controller 70 may generate multiple threshold signals 75, each threshold signal 75 based on a particular calibration wave 40 received by a different receiver 30. Each resulting threshold signal 75 is a waveform representing calibration waves 40 reflected from an environment in which no targets 60 are present, and may incorporate modifications to allow for variances in clutter. For example, in particular embodiments, a user may set or vary the amount by which calibration wave 40 is increased in amplitude and linearly phase-distorted according to the environment in which system 10 operates or the stability of system 10 itself. Thus, a user has control over the sensitivity level by which system 10 detects targets 60.

Once system 10 transmits and receives calibration waves 40, and generates one or more threshold signals 75 based thereon, system 10 transmits operating waves 50 to facilitate the detection of targets 60. In particular embodiments, operating waves 50 are transmitted impulsively in an ultra-wideband radio frequency spectrum. Impulsive electromagnetic wave transmission may include transmitting electromagnetic waves in rapid succession, each electromagnetic wave transmission lasting for a substantially identical and predetermined time period. Impulsive transmission may provide system 10 with a natural protection against carrier-wave interference. In general however, system 10 may transmit operating wave 50 in any appropriate band of the electromagnetic spectrum and in any appropriate manner.

Operating waves 50 collide with target 60, and reflect toward receivers 30. Receivers 30 receive multiple operating waves 50, each received operating wave 50 having a duration substantially equivalent to or proportional to the duration of transmitted operating wave 50. Additionally, system controller 70 may compare received operating wave 50 to one or more of threshold signals 75 previously generated by system controller 70. Received operating wave 50 and threshold signal 75 are compared over a time period corresponding to the substantially identical and predetermined time period with which transmitter 20 transmitted operating waves 50 and calibration waves 40. In particular embodiments, system controller 70 may subtract threshold signal 75 from received operating wave 50. Additionally, as discussed above with particular reference to processing received calibration waves 40, system controller 70 may perform carrier-wave interference suppression, waveform alignment, close blanking, and signal conditioning on each received operating wave 50. System controller 70 may perform these additional processing steps on received operating waves 50 before or after processing operating wave 50 based on threshold signal 75.

As discussed above, in particular embodiments of system 10 including multiple receivers 30, system controller 10 may generate multiple threshold signals 75, each based on calibration waves 40 received by a different receiver 30. Thus, a different threshold signal 75 may be generated for every receiver 30 included in system 10. System controller 70 may compare each threshold signal 75 to operating wave 50 received by its associated receiver 30. Thus, system controller 70 operates in the time domain to cancel a portion of the received operating wave 50 corresponding to the background environment and clutter. System controller 70 transmits an electronic signal to display 80 corresponding to the portion of received operating wave 50 with an amplitude greater than threshold signal 75. This portion corresponds to target 60. In this manner, system 10 facilitates detection and analysis of target 60 by receiving calibration waves 40, generating threshold signal 75 based on received calibration waves 40, and comparing threshold signal 75 to received operating waves 50.

Display 80 receives electronic signals from system controller 70 corresponding to operating waves 50 processed by system controller 70. Display 80 generates an image representing target 60, based on the received electronic signals. For example, in particular embodiments, display 80 may display an image representing an overhead view of the area surrounding vehicle 90. This image may include a dot or other marker representing the location of target 60. In particular embodiments, display 80 may generate a one-dimensional image based on operating waves received by a single receiver 30. In particular embodiments, display 80 may also display a three-dimensional image representing target 60. In particular embodiments of system 10 that include multiple receivers 30, each receiver 30 may be positioned at a different distance, different elevation angle, and different azimuth angle from target 60. Thus, each receiver 30 has a different perspective of target 60. System controller 70 may process operating waves 50 received by each receiver 30 according to the process detailed above, and may combine the resulting waveforms to generate and transmit to display 80 an electronic signal representing target 60. Display 80 receives the electronic signal and displays a three-dimensional image representing target 60. Additionally, display 80 may toggle among different views. For example, display 80 may toggle between viewing a one dimensional image based on a single receiver 30 and viewing a three-dimensional image based on multiple receivers 30. In general, however, display 80 may display electronic images representing target 60 in any appropriate manner.

By operating in the time domain to reduce or eliminate environmental interference and clutter, system 10 facilitates the detection of target 60 which would otherwise be obscured. Thus, system 10 improves the probability of detecting target 60. Additionally, although system 10 is operable under a wide array of conditions and configurations, system 10 substantially reduces or eliminates clutter associated with a moving, ground-based vehicle. Clutter is also reduced in particular embodiments of system 10 in which calibration waves 40 and operating waves 50 are transmitted impulsively, because impulsive transmission provides system 10 with a natural immunity to carrier-wave interference. As a result, system 10 allows for the detection of targets 60 when operating on moving vehicle 90 or in rough or difficult terrain. In addition, system 10 allows a user to more precisely and accurately locate target 60 by utilizing multiple receivers 30 and generating a three-dimensional image representing target 60. Additionally, at appropriate times during operation, system 10 may allow for the background environment to be characterized when no targets 60 are present. Thus, system 10 may be periodically re-calibrated while continuing detection of targets 60. Moreover, system 10 may include elements of a multi-static radar system, allowing for dynamic arrangement of transmitters 20 and receivers 30. That is, the location of transmitters 20 and receivers 30 as positioned on vehicle 90, or as fixed in the ground, may be dynamically configurable according to the particular needs of a user, the terrain in which system 10 is operating, or any other factors, considerations, variables, or conditions. Additionally, certain elements of system 10, including transmitter 20, receivers 30, system controller 70, and display 80 may be rapidly installed or removed, allowing for quick reaction to changing events. Dynamic arrangement thus allows for optimal target detection in a variety of situations and environments. As a result, system 10 may provide numerous operational benefits. Nonetheless, particular embodiments may provide some, none, or all of these operational benefits.

Figure 2:
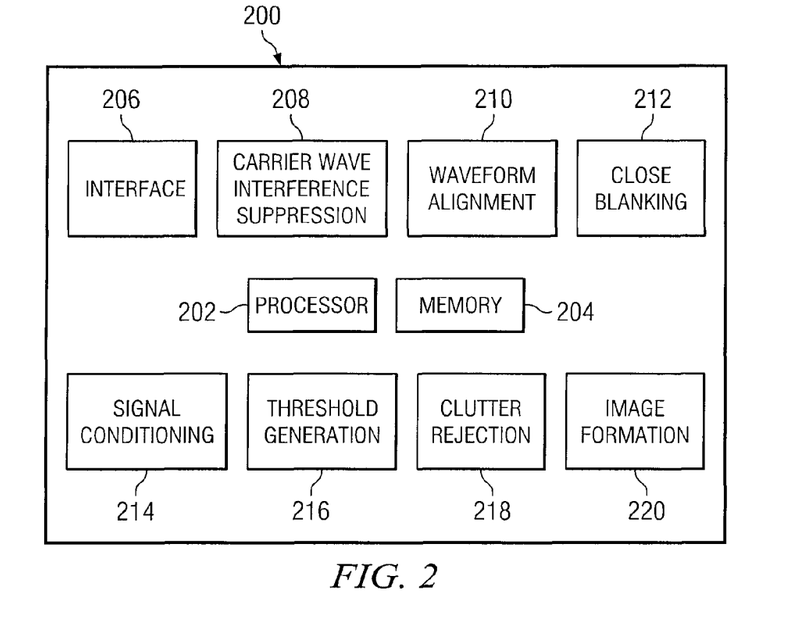
FIG. 2 is a block diagram illustrating the processor of FIG. 1 in more detail, including aspects of an embodiment of the present invention.

FIG. 2 is a block diagram illustrating in greater detail the contents and operation of a particular embodiment of system controller 70 shown in FIG. 1. In general, as discussed above with respect to FIG. 1, system controller 200 generates calibration waves 40 and operating waves 50 for transmission by transmitter 20, receives electronic signals from receiver 30 corresponding to calibration waves 40 and operating waves 50 reflected from target 60 and received by receiver 30, processes the received calibration waves 40 and operating waves 50, and transmits an electronic signal corresponding to target 60 to display 80. As shown in FIG. 2, system controller 200 may include a processor 202, a memory 204, an interface module 206, a carrier-wave interference suppression module 208, a waveform alignment module 210, a close blanking module 212, a signal conditioning module 214, a threshold generation module 216, a coupling and clutter rejection module 218, and an image formation module 220.

Processor 202 may represent or include any form of processing component, including general purpose computers, dedicated microprocessors, or other processing devices capable of processing electronic information. Examples of processor 202 include digital signal processors (DSPs), application-specific integrated circuits (ASICs), field-programmable gate arrays (FPGAs), and any other suitable specific or general purpose processors. Although FIG. 2 illustrates a particular embodiment of system controller 70 that includes a single processor 202, system controller 70 may, in general, include any suitable number of processors 202.

Memory 204 stores processor instructions, carrier-wave interference suppression instructions, waveform alignment instructions, close blanking instructions, signal conditioning instructions, coupling and clutter rejection instructions, image formation instructions, threshold signals 75, and/or any values and parameters that system controller 70 utilizes during operation. Memory 204 may comprise any collection and arrangement of volatile or non-volatile components suitable for storing data. For example, memory may comprise random access memory (RAM) devices, read only memory (ROM) devices, magnetic storage devices, optical storage devices, or any other suitable data storage devices. In particular embodiments, memory 204 may represent, in part, computer-readable media on which computer instructions are encoded. In such embodiments, some or all the described functionality of system controller 70 may be provided by processor 202 executing the instructions encoded on the described media. Although shown in FIG. 2 as a single component, memory 204 may represent any number of memory elements within, local to, or accessible by system controller 70. Additionally, although shown in FIG. 2 as being located internal to system controller 70, memory 204 may represent storage components remote from system controller 70, such as elements at a Network Attached Storage (NAS), Storage Area Network (SAN), or any other type of remote storage component.

Interface module 206 couples system controller 70 to appropriate components of system 10 to facilitate communication between system controller 70, transmitter 20, one or more receivers 30, display 80, and/or other appropriate components of system 10. For example, system controller 70 may transmit calibration waves 40 or operating waves 50 to transmitter 20, receive electronic signals from receiver 30, or transmit electronic signals to display 80 through interface module 206. In particular embodiments, interface module 206 includes or represents one or more interface cards suitable for communication over a network, or a connection to an electronic bus. Additionally, although FIG. 2 illustrates a particular embodiment of system controller 70 that includes a interface module 206, system controller 70 may, in general, include any suitable number of interface modules 206.

Carrier-wave interference suppression module 208 processes received calibration waves 40 and operating waves 50 by performing carrier-wave interference suppression in the frequency domain. A primary source of electromagnetic interference is from cell phones, other personal communications systems, commercial television, radio stations and security systems. Carrier-wave interference suppression reduces or eliminates this environmental interference by filtering out undesirable frequencies.

Waveform alignment module 210 processes received calibration waves 40 and operating waves 50 by performing waveform alignment to time-align received calibration waves 40 to correct for path delays which may occur in particular embodiments of system 10 that include multiple receivers 30. In particular embodiments of system 10 that include multiple receivers 30, each receiver 30 may be positioned a different respective distance, elevation angle, and azimuth angle from the reflecting object, which may include target 60, the ground, air, water, or any other environmental object. Thus, although reflected from the same object, received calibration waves 40 or operating waves 50 may arrive at each receiver 30 at different points in time. Waveform alignment determines the correct time reference for each received calibration wave 40 or operating wave 50 so that algorithmic processing may occur on the correct time sample simultaneously on all received calibration waves 40 or operating waves 50.

Close blanking module 212 processes received calibration waves 40 and operating waves 50 by performing close blanking to reduce or eliminate electromagnetic waves reflected from within the antenna head or from objects in close proximity to transmitter 20 or receivers 30. In particular embodiments, close blanking may be accomplished by setting to zero the amplitude of a portion of received calibration wave 40 or operating wave 50 corresponding to the earliest temporal portion of the respective wave.

Signal conditioning module 214 processes received calibration waves 40 and operating waves 50 by performing signal conditioning on the received calibration waves 40 and operating waves 50. In particular embodiments, signal conditioning may include cross-correlation with a representative waveform, envelope detection, and/or advanced processing techniques such as Wiener-Levinson deconvolution, spiking (wavelet compression), and echo detection.

Threshold generation module 216 receives an electronic signal corresponding to processed calibration waves 40 and generates threshold signal 75 for comparison with operating waves 50. As discussed with reference to FIG. 4A-4C below, threshold signal 75 may be generated by increasing the amplitude of calibration waves 40 and/or by linearly phase-distorting calibration waves 40. In particular embodiments of system 10 that include multiple receivers, threshold generation module 216 may generate multiple threshold signals 75, each based on and associated with calibration waves 40, each received by a different receiver 30.

Clutter rejection module 218 processes received calibration waves 40 and operating waves 50 by performing clutter rejection in the time domain. In particular embodiments, clutter rejection may be performed by comparing received operating waves 50 to threshold signal 75 generated by threshold generation module 216. In particular embodiments, clutter rejection module may subtract threshold signal 75 from received operating wave 50. Additionally, clutter rejection module 218 may send the results of the comparison as an electronic signal to display 80.

Image formation module 220 receives electronic signals corresponding to processed operating waves 50, and generates and transmits to display 80 an electronic signal corresponding to an image representing target 60. In particular embodiments, image formation module 220 may generate an electronic signal corresponding to a one-dimensional image based on operating waves received by a single receiver 30. In particular embodiments, image formation module 220 may generate an electronic signal corresponding to a three-dimensional image based on operating waves 50, each received by a different receiver 30. In particular embodiments of system 10 that include multiple receivers 30, each receiver 30 may be positioned at a different distance, a different elevation angle, and a different azimuth angle from target 60. Thus, each receiver 30 has a different perspective of target 60. System controller 70 may process operating waves 50 received by each receiver 30 in accordance with the process described above, and image formation module 220 may combine the resulting waveforms to generate an electronic signal corresponding target 60. Image formation module 220 transmits the electronic signal to display 80, and display 80 generates a three-dimensional image representing target 60. Image formation module 220 may generate multiple electronic signals corresponding to target 60. For example, image formation module may generate an electronic signal corresponding to a one dimensional image or a three-dimensional image simultaneously, allowing a user to toggle among different images.

In general, each of processor 202, memory 204, interface module 206, carrier-wave interference suppression module 208, waveform alignment module 210, close blanking module 212, signal conditioning module 214, clutter rejection module 218, threshold generation module 216, and image formation module 220 may represent any appropriate combination of hardware and/or software suitable to provide the described functionality. Additionally, any two or more of interface module 206, carrier-wave interference suppression module 208, waveform alignment module 210, close blanking module 212, signal conditioning module 214, threshold generation module 216, clutter rejection module 218, and image formation module 220 may represent or include common elements. In particular embodiments, interface module 206, carrier-wave interference suppression module 208, waveform alignment module 210, close blanking module 212, signal conditioning module 214, threshold generation module 216, clutter rejection module 218, and image formation module 220 may represent, in whole or in part, software applications being executed by processor 202.

Figure 3:
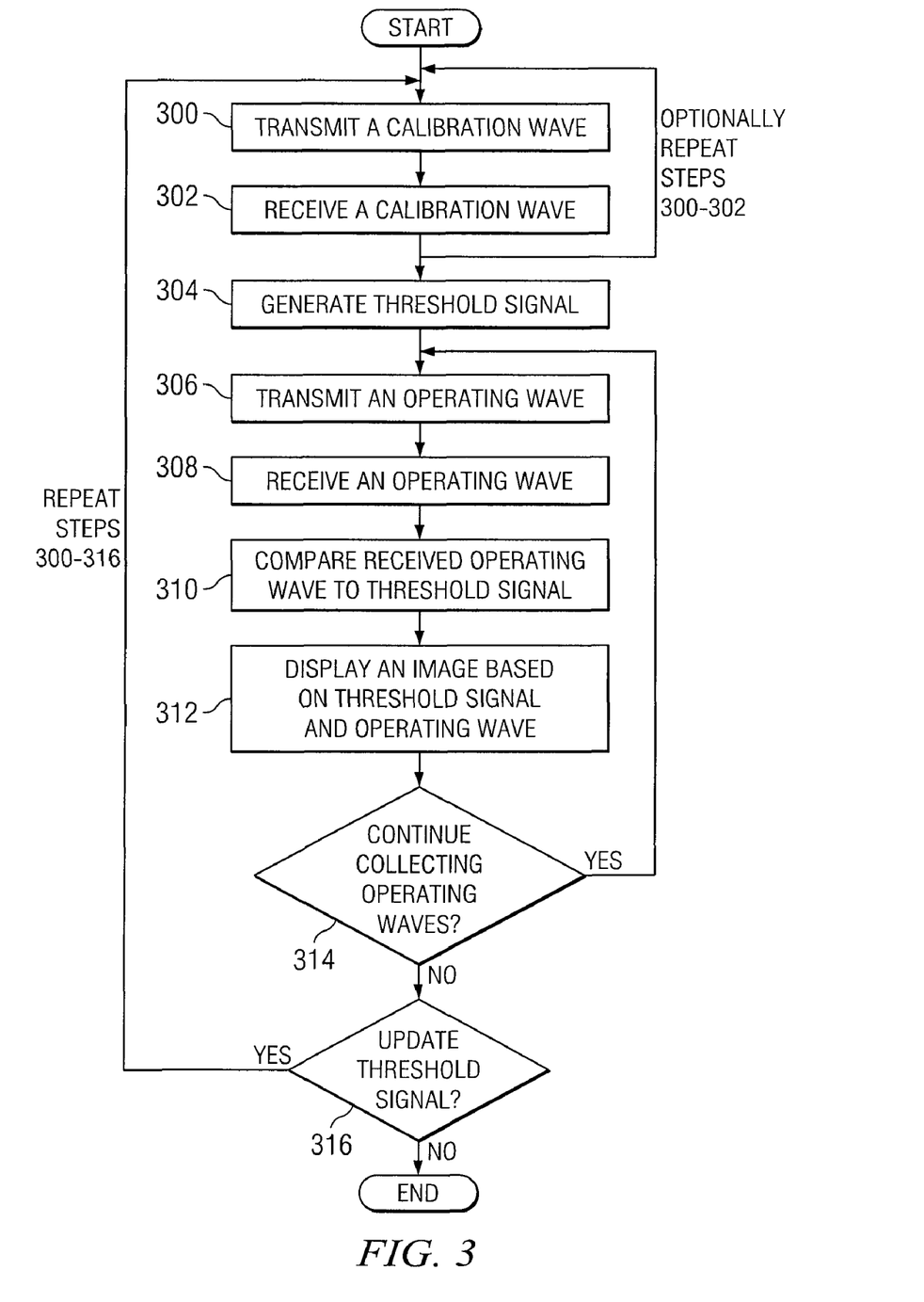
FIG. 3 is a flow chart illustrating a method for transmitting, receiving, and processing electromagnetic waves in accordance with an embodiment of the present invention.

FIG. 3 is a flowchart illustrating operation of a particular embodiment of system 10 in processing electromagnetic waves. The steps illustrated in FIG. 3 may be combined, modified, or deleted where appropriate, and additional steps may also be added to those shown. Additionally, the steps may be performed in any suitable order without departing from the scope of the invention.

Operation, in the illustrated example, begins at step 300 with transmitter 20 transmitting calibration wave 40. In particular embodiments, transmitter 20 may transmit ultra-wideband radio frequency waves, microwaves, or any other appropriate frequency band of the electromagnetic spectrum suitable for transmission by transmitter 20 and reception by receiver 30. Transmitter 20 may impulsively transmit calibration waves 40 in rapid succession, each wave lasting for a substantially identical and predetermined time period.

At step 302, receiver 30 receives calibration wave 40 corresponding to calibration wave 40 transmitted in step 300 and reflected from the ground, water, air, or other aspect of the environment. In particular embodiments, system 10 may include one or more receivers 30. In such embodiments, one or more receivers 30 may receive calibration wave 40. System controller 70 may processes the received calibration wave 40 by performing carrier-wave interference suppression, waveform alignment, close blanking, and signal conditioning. In particular embodiments, steps 300 and 302 may be repeated before advancing to step 304. As a result, system 10 may transmit and receive multiple calibration waves 40, which are each processed by system controller 70 by performing carrier-wave interference suppression, waveform alignment, close blanking, and signal conditioning. Additionally, system controller 70 may record, condition and average together each of the multiple calibration waves 40 to obtain an average representation of an environment in which no targets 60 are present.

At step 304, system controller 70 generates threshold signal 75 based on one or more of the received calibration waves 40. In particular embodiments, system controller 70 may generate threshold signals 75 by increasing the amplitude of calibration waves 40 and linearly phase-distorting calibration waves 40. In particular embodiments, system controller 70 may make no modification to received calibration waves 40, and threshold signal 75 may be identical to one or more received calibration waves. In particular embodiments of system 10 in which system controller receives, combines and averages multiple calibration waves 40, system controller 70 may generate threshold signal 75 by increasing the amplitude of and linearly phase-distorting the average calibration wave 40. Additionally, system controller 70 may make no modifications to the average calibration wave 40, and threshold signal 70 may be identical to the average calibration wave 40. Each resulting threshold signal 75 is a waveform representing calibration waves 40 reflected from an environment in which no targets 60 are present, and may incorporate modifications to amplitude and phase to allow for variances in environmental interference and clutter.

At step 306, transmitter 20 transmits operating wave 50. In particular embodiments, transmitter 20 may transmit ultra-wideband radio frequency waves, microwaves, or any other appropriate frequency band of the electromagnetic spectrum suitable for transmission by transmitter 20 and reception by receiver 30. Transmitter may impulsively transmit operating waves 50 in rapid succession, each wave lasting for a substantially identical and predetermined time period.

At step 308, receiver 30 receives operating wave 50 corresponding to operating wave 50 transmitted in step 306 and reflected from target 60, the ground, water, air, and/or other aspect of the environment. In particular embodiments of system 10 that include multiple receivers 30, one or more receivers 30 may receive operating wave 50. System controller 70 may processes each of received operating waves 50 by performing carrier-wave interference suppression, waveform alignment, close blanking, and signal conditioning.

At step 310, system controller 70 compares received operating wave 50 to the stored threshold signal 75 generated in step 304. Received operating wave 50 and threshold signal 75 are compared over an identical period corresponding to the substantially identical and predetermined time period with which transmitter 20 transmitted operating wave 50 and calibration waves 40. In particular embodiments, system controller 70 may compare threshold signal 75 and received operating wave 50 by subtracting threshold signal 75 from received operating wave 50. As discussed above with respect to FIG. 1, in particular embodiments of system 10 including multiple receivers 30, system controller 10 may generate multiple threshold signals 75, each associated with a different receiver 30. System controller 70 may compare each threshold signal 75 to the operating wave received by its associated receiver 30.

At step 312, display 80 displays an image representing target 60. In particular embodiments, system controller 70 transmits an electronic signal to display 80 based on the comparison of threshold signal 75 and received operating wave 50. Thus, the electronic signal may represent a portion of received operating wave 50 with an amplitude greater than threshold signal 75. This portion may correspond to target 60. Display 80 converts the electronic signal into an image representing target 60. In particular embodiments, display 80 may also display a three-dimensional image representing target 60. In particular embodiments of system 10 that include multiple receivers 30, each receiver 30 may be positioned at a different distance, a different elevation angle, and a different azimuth angle from target 60. Thus, each receiver 30 has a different perspective of target 60. System controller 70 may process operating waves 50 received by each receiver 30 according to the process detailed above, and may combine the resulting waveforms to generate an electronic signal corresponding to target 60. Thus, at step 312, display 80 receives the electronic signal and may display a three-dimensional image representing target 60.

At step 314, a user determines whether to continue the transmission and reception of operating waves. If so, steps 306-312 may be repeated to continue the collection of operating waves and the displaying of images representing target 60 before advancing to step 316. If not, operation proceeds to step 316.

At step 316, a user determines whether to update the threshold used in generating a display. In particular embodiments in which system 10 is positioned on moving vehicle 90, the surrounding terrain in which system 10 is operating may change. Thus, system 10 may be periodically recalibrated by transmitting and receiving one or more additional calibration waves 40. As a result, at step 316, operation of system 10 may return to step 300 as shown. Operation then continues by repeating steps 300-316. Alternatively, subsequent to step 316, operation of system 10 may end with respect to generating images of target 60, as shown in FIG. 3.

Figure 4A:
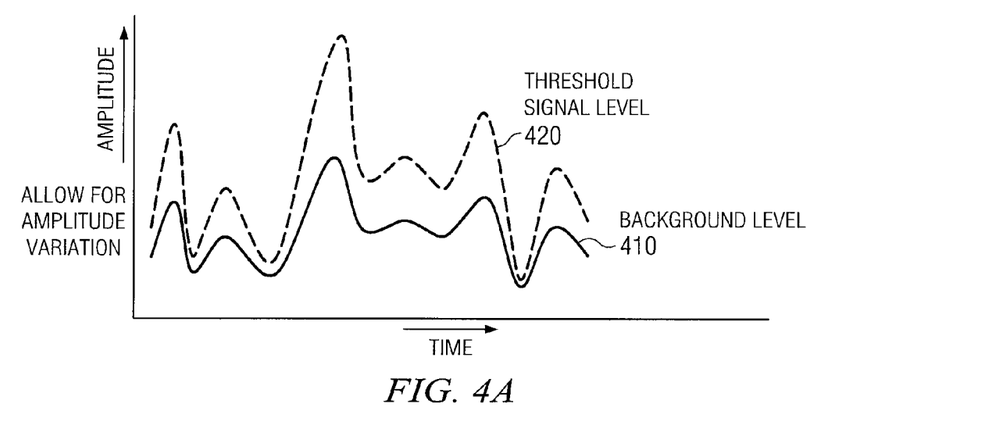
FIGS. 4A-4C are time vs. amplitude plots illustrating the effect of an embodiment of the present invention increasing the amplitude of and linearly phase-distorting electromagnetic waves.
Figure 4B:
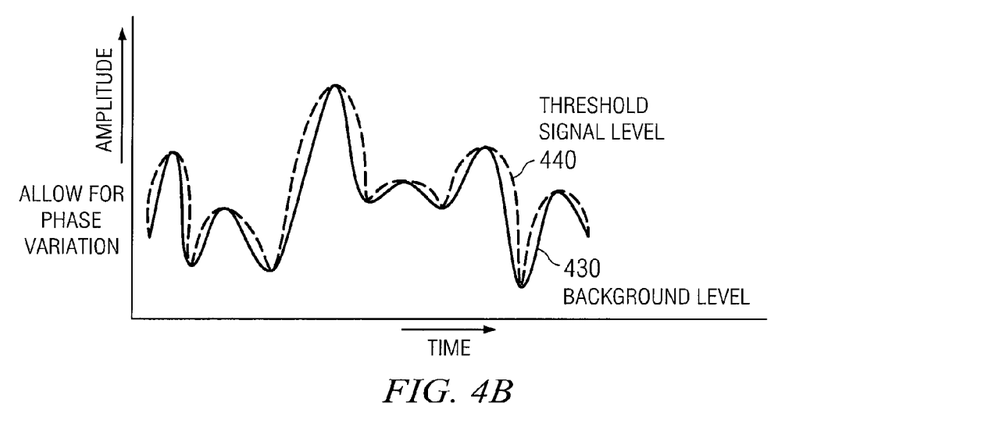
Figure 4C:
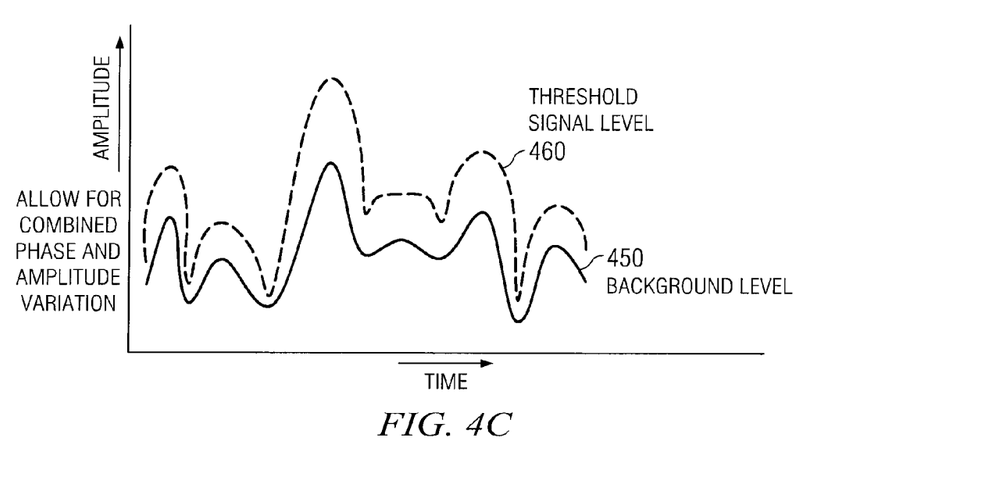

FIGS. 4A-4C are illustrations visually depicting system controller 70 increasing the amplitude of and linearly phase-distorting calibration wave 40 or operating wave 50. FIG. 4A depicts a waveform representing calibration wave 40 and a waveform representing threshold signal 75 that system controller 70 generates by increasing the amplitude of received calibration wave 40. Background Level 410 indicates the waveform of received calibration wave 40. System controller 70 increases the amplitude of calibration wave 40 by a predetermined fixed or relative amount. As a result, Threshold Signal Level 420 indicates the amplitude of the resulting threshold signal 75. Additionally, in particular embodiments, a user may vary the amount by which the amplitude of received calibration wave 40 is increased, allowing a user to control the sensitivity level with which system 10 detects targets 60.

FIG. 4B depicts a waveform representing calibration wave 40 and a waveform representing threshold signal 75 that system controller 70 generates by linearly phase-distorting received calibration wave 40. Background Level 430 indicates the waveform of received calibration wave 40. System controller 70 linearly phase-distorts calibration wave 40 by a predetermined fixed or relative amount. As a result, Threshold Signal Level 440 indicates the phase of the resulting threshold signal 75. Additionally, a user may vary the amount by which the phase of the received calibration wave 40 is linearly phase-distorted, allowing the user to control the sensitivity level with which system 10 detects targets 60.

FIG. 4C depicts a waveform representing calibration wave 40 and a waveform representing threshold signal 75 that system controller 70 generates by increasing the amplitude of received calibration wave 40 and linearly phase-distorting received calibration wave 40. Background Level 450 indicates the waveform of received calibration wave 40. System controller 70 increases the amplitude of and linearly phase-distorts calibration wave 40, each by a predetermined fixed or relative amount. As a result, Threshold Signal Level 460 indicates the amplitude and the phase of the resulting threshold signal 75. Additionally, a user may vary the amount by which the amplitude and phase of received calibration wave 40 are modified, allowing the user to control the sensitivity level with which system 10 detects targets 60.

What is claimed is:

1. A method for processing radio frequency signals, comprising:
   transmitting a first transmitted calibration radio frequency (RF) signal into a background environment in which no targets are present;
   receiving a first received calibration (RF) signal associated with the first transmitted calibration RF signal, the first received calibration RF signal reflected from the background environment and indicative of the environment in which no targets are present;
   generating a first threshold signal based at least in part on the first received calibration RF signal;
   transmitting a second transmitted operation RF signal;
   receiving a second received operation RF signal associated with the second transmitted RF signal; and
   generating a display based on, at least in part, the first threshold signal and the second received operation RF signal.

2. The method of claim 1, wherein generating a display comprises generating a display based on subtracting the first threshold signal from the second received RF signal.

3. The method of claim 1, wherein receiving a first received RF signal comprises receiving the first received RF signal during a predetermined length of time, and wherein generating a first threshold signal comprises generating the first threshold signal corresponding to the predetermined length of time, and wherein receiving a second received RF signal comprises receiving the second received RF signal during the predetermined length of time.

4. The method of claim 1, further comprising:
   transmitting a third transmitted RF signal;
   receiving a third received RF signal associated with the third transmitted RF signal; and
   generating a second threshold signal based, at least in part, on the third received RF signal.

5. The method of claim 4, wherein generating the second threshold signal comprises combining the first received RF signal and the third received RF signal.

6. The method of claim 4, wherein generating the second threshold signal comprises averaging the first received RF signal and the third received RF signal.

7. The method of claim 1, wherein generating the first threshold signal comprises:
   modifying the phase of the first received RF signal;
   modifying the amplitude of the first received RF signal; and
   generating the first threshold signal based on the modified first received RF signal.

8. The method of claim 1, wherein generating the display comprises:
   receiving the first received RF signal comprises receiving, at each of a plurality of receivers, a received RF signal associated with the first transmitted RF signal;
   generating the threshold signal comprises generating a plurality of threshold signals, wherein each threshold signal is generated based at least in part on one of the received RF signals associated with the first transmitted RF signal;
   receiving the second received RF signal comprises receiving, at each of the plurality of receivers, a received RF signal associated with the second transmitted RF signal; and
   generating the display comprises generating a multi-dimensional display based at least in part on the received RF signals associated with the second transmitted RF signal and the threshold signals.

9. A radio frequency signal processing system comprising:
   a transmitter operable to:
      transmit a first transmitted calibration radio frequency (RF) signal into a background environment in which no targets are present; and
      transmit a second transmitted operation RF signal;
   a first receiver operable to:
      receive a first received calibration RF signal associated with the first transmitted calibration RF signal, the first received calibration RF signal reflected from the background environment and indicative of the background environment in which no targets are present; and receive a second received operation RF signal associated with the second transmitted RF signal; and a processor operable to:
generate a first threshold signal based, at least in part, on the first received calibration RF signal; and
generate a display based on, at least in part, the second received operation RF signal and the first threshold signal.

10. The system of claim 9, wherein the processor is operable to generate a display by generating a display based on subtracting the first threshold signal from the second received RF signal.

11. The system of claim 9, wherein the receiver is operable to:
receive the first received RF signal by receiving the first received RF signal during a predetermined length of time; and
receive the second received RF signal by receiving the second received RF signal during the predetermined length of time; and
wherein the processor is operable to generate the first threshold signal by generating the first threshold signal corresponding to the predetermined length of time.

12. The system of claim 9, wherein the transmitter is further operable to transmit a third transmitted RF signal; and
wherein the receiver is further operable to receive a third received RF signal associated with the third transmitted RF signal; and
wherein the processor is further operable to generate a second threshold signal based, at least in part, on the third received RF signal.

13. The system of claim 12, wherein the processor is operable to generate the second threshold signal by combining the first received RF signal and the third received RF signal.

14. The system of claim 12, wherein the processor is operable to generate the second threshold signal by averaging the first received RF signal and the third received RF signal.

15. The system of claim 9, wherein the processor is operable to generate the first threshold signal by:
modifying the phase of the first received RF signal;
modifying the amplitude of the first received RF signal; and
generating the first threshold signal based on the modified first received RF signal.

16. The system of claim 9, wherein:
the first receiver comprises one of a plurality of receivers; and
the processor is operable to:
receive the first received RF signal by receiving, at each of the plurality of receivers, a received RF signal associated with the first transmitted RF signal;
generate the threshold signal by generating a plurality of threshold signals, wherein each threshold signal is generated based at least in part on one of the received RF signals associated with the first transmitted RF signal;
receive the second received RF signal by receiving, at each of the plurality of receivers, a received RF signal associated with the second transmitted RF signal; and
generate the display by generating a multi-dimensional display based at least in part on the received RF signals associated with the second transmitted RF signal and the threshold signals.

17. Logic for processing radio frequency signals, the logic encoded on tangible media and operable, when executed on a processor to:
transmit a first received calibration radio frequency (RF) signal into a background environment in which no targets are present;
receive a first received calibration RF signal associated with the first transmitted calibration RF signal, the first received calibration RF signal reflected from the background environment and indicative of the environment in which no targets are present;
generate a first threshold signal based at least in part on the first received calibration RF signal;
transmit a second transmitted operation RF signal;
receive a second received operation RF signal associated with the second transmitted RF signal; and
generate a display based on, at least in part, the second received RF signal and the first threshold signal.

18. The logic of claim 17, wherein the logic is operable to generate a display by generating a display based on subtracting the first threshold signal from the second received RF signal.

19. The logic of claim 17, wherein the logic is operable to:
receive a first received RF signal by receiving the first received RF signal during a predetermined length of time;
generate a first threshold signal by generating the first threshold signal corresponding to the predetermined length of time; and
receive a second received RF signal by receiving the second received RF signal during the predetermined length of time.

20. The logic of claim 17, wherein the logic is further operable to:
transmit a third transmitted RF signal;
receive a third received RF signal associated with the third transmitted RF signal; and
generate a second threshold signal based, at least in part, on the third received RF signal.

21. The logic of claim 20, wherein the logic is operable to generate the second threshold signal by combining the first received RF signal and the third received RF signal.

22. The logic of claim 20, wherein the logic is operable to generate the second threshold signal by averaging the first received RF signal and the third received RF signal.

23. The logic of claim 17, wherein the logic is operable to generate the first threshold signal by:
modifying the phase of the first received RF signal;
modifying the amplitude of the first received RF signal; and
generating the first threshold signal based on the modified first received RF signal.

24. The logic of claim 17, wherein the logic is operable to:
receive the first received RF signal by receiving, at each of a plurality of receivers, a received RF signal associated with the first transmitted RF signal;
generate the threshold signal by generating a plurality of threshold signals, wherein each threshold signal is generated based at least in part on one of the received RF signals associated with the first transmitted RF signal;
receive the second received RF signal by receiving, at each of the plurality of receivers, a received RF signal associated with the second transmitted RF signal; and
generate the display by generating a multi-dimensional display based at least in part on the received RF signals associated with the second transmitted RF signal and the threshold signals.

25. A system for processing radio-frequency signals, comprising:
- means for transmitting a first transmitted calibration RF signal into a background environment in which no targets are present;
- means for receiving a first received calibration RF signal associated with the first transmitted calibration RF signal, the first received calibration RF signal reflected from the background environment and indicative of the environment in which no targets are present;
- means for generating a first threshold signal based at least in part on the first received calibration RF signal;
- means for transmitting a second transmitted operation RF signal;
- means for receiving a second received operation RF signal associated with the second transmitted RF signal; and
- means for generating a display based on, at least in part, the second received operation RF signal and the first threshold signal.

* * * * *